United States Patent [19]
Ramirez et al.

[11] Patent Number: 5,672,120
[45] Date of Patent: Sep. 30, 1997

[54] GOLF CLUB HEAD

[75] Inventors: Stan L. Ramirez, 7005 Santa Rita Ct., Fort Worth, Tex. 76133; Louis P. Spartin, P.O. Box 16704, Ft. Worth, Tex. 76162

[73] Assignees: Specialty Materials and Manufacturing Inc.; John E. Carbaugh, Jr., both of Rosslyn, Va.; Stan L. Ramirez; Louis P. Spartin, both of Fort Worth, Tex.

[21] Appl. No.: 440,258

[22] Filed: May 12, 1995

[51] Int. Cl.$^6$ ............................................. A63B 53/04
[52] U.S. Cl. ............................................. 473/347; 473/349
[58] Field of Search ................................. 473/324, 342, 473/343, 345, 346, 347, 348, 349, 350; 264/136, 137, 257, 258

[56] References Cited

U.S. PATENT DOCUMENTS

| | | |
|---|---|---|
| 3,657,774 | 4/1972 | Reynolds . |
| 4,581,190 | 4/1986 | Nagamoto et al. .............. 473/346 |
| 4,650,626 | 3/1987 | Kurokawa . |
| 4,664,383 | 5/1987 | Aizawa .......................... 473/348 |
| 4,754,975 | 7/1988 | Aizawa .......................... 473/348 |
| 4,778,185 | 10/1988 | Kurokawa ...................... 473/347 |
| 4,793,616 | 12/1988 | Fernandez ..................... 473/347 |
| 4,883,623 | 11/1989 | Nagamoto et al. .............. 473/346 |
| 5,007,643 | 4/1991 | Okumoto et al. ............... 473/347 |
| 5,083,780 | 1/1992 | Walton et al. . |
| 5,242,168 | 9/1993 | Aizawa .......................... 473/346 |
| 5,306,450 | 4/1994 | Okumoto et al. ............... 264/45.1 |

*Primary Examiner*—Steven B. Wong
*Attorney, Agent, or Firm*—Wenderoth, Lind & Ponack

[57] ABSTRACT

The present invention is directed to a golf club head comprising a central core having an outer surface, at least one continuous fiber extending around at least a portion of the outer surface of the core closest to the club face, and an external resin layer which covers the core and the continuous fiber. Preferably, the core is comprised of a syntactic foam which is entirely covered with a braided construction of a plurality of continuous graphite composite fibers.

21 Claims, 2 Drawing Sheets

SYNTACTIC FOAM

GOLF CLUB HEAD

BACKGROUND OF THE INVENTION

1. Field of the Invention

The present invention relates to a golf club head which is useful for constructing golf clubs which include woods, irons, putters and the like having improved design and performance characteristics.

2. Description of Related Art

As conventionally known, golf clubs are basically of two types: woods and irons. The woods are primarily used to attain maximum distance, while the irons are used to achieve shorter distances.

"Iron" club heads have been made from steel or steel alloys, including stainless steel, which may be chrome plated. The head portion may be cast, forged or machined to provide a blade which is integrated into the hosel or neck portion of the golf club. The blade portion serves to strike the ball, whereas the hosel portion serves to connect the blade to the club shaft.

Typically, most "wood" club heads are now constructed of synthetic resin, composed of an outer shell of resin reinforced with chopped fiber pieces surrounded by a core of rigid polyurethane foam which is bound together by molding. But, the rigid polyurethane foam core possesses low compression strength which, when compression molded to the outer shell, results in the production of voids on the outer shell surface.

In order to provide added strength to the golf club head, graphite fabric has been used to reinforce the resin outer shell. Flat woven graphite fabric pre-impregnated with resin (also known as prepreg) is draped over a shaped core, or patches of graphite fabric are pieced together around a core material (see FIG. 1). The resultant parts are then pressed in between two mold surfaces and heated until the resin is cured. However, the fibers thus formed are discontinuous over the core and have a limited ability to distribute the impact load generated when the golf club head strikes a golf ball.

SUMMARY OF THE INVENTION

As a first aspect of the present invention, it is an object of the invention to provide a golf club head having a core material which possesses an improved compressive strength.

As a second aspect of the invention, it is an object of the invention to provide a golf club head having a fiber-reinforced outer shell which provides an improved efficient energy transfer upon ball impact, such that the impact load generated when the golf club head strikes a golf ball is more equally distributed over the head in order to optimize energy transfer while retaining directional control.

In accordance with the present invention, an improved golf club head and a method of making thereof is disclosed which results in a golf club which is light, durable and capable of attaining increased distance and accuracy of a golf ball upon impact when compared to conventional golf clubs.

The first aspect of the invention is achieved through the use of a golf club head which comprises a central core comprised of a syntactic foam. The use of a syntactic foam core according to the invention for a golf club head is novel in the art.

The second aspect of the invention is achieved through the use of a golf club head composed of a core reinforced by a continuous fiber extending around the core. Preferably, the core is wrapped with a plurality of fiber strands which entirely surround the core surface with a braided fiber construction, such that the club head uniformly distributes impact load and provides for even fiber tension throughout the club head.

Additionally, in constructing the golf club head of this invention, a third aspect of the invention is further directed to the method for making the golf club head which comprises the steps of providing a shaped core, wrapping a continuous fiber around the core, encasing the fiber wrapped core with resin, and curing the resin.

BRIEF DESCRIPTION OF THE FIGURES

With the above and related objects in view, the invention comprises the details of construction and combination of parts, as will be more fully understood from the following description, when read in conjunction with the accompanying drawings, in which.

DETAILED DESCRIPTION OF THE PREFERRED EMBODIMENTS

Figure 1:
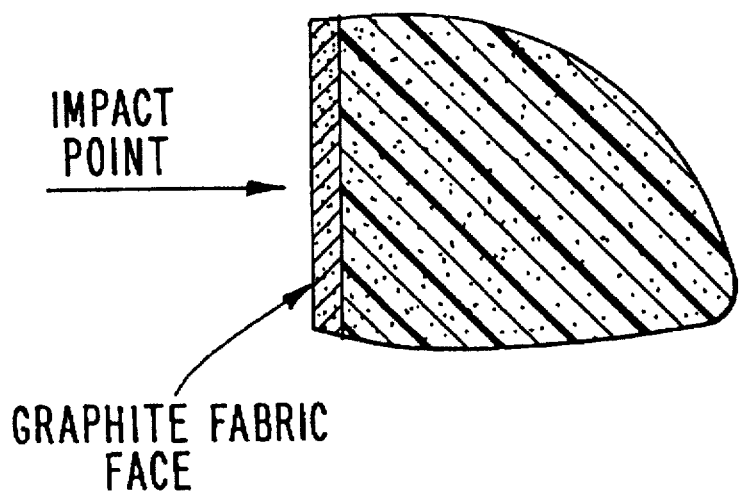
FIG. 1 is a cross-sectional side view of a prior art golf club head which has a graphite fabric pre-impregnated with resin draped over the front of the core of the head.

To construct a golf club head according to the present invention, the shape of the core for the golf club must first be determined and then the core must be manufactured.

According to the second aspect of the invention, the core can be manufactured in any conventional shape from foam, wood, metal, or any sufficiently hard material to hold a shape and withstand a uniformly applied force of 50–80 pounds per square inch (psi). Optimally, the core should be approximately 0.050 inches smaller on all surfaces than the final desired size to allow for the application of the braided skin. The core should be cleaned to remove any dirt, dust, sanding residue, etc., that would interfere with obtaining a good adhesive bond to the surface. The resin that holds the fibers together also must stick to the surface of the core to assure no air gaps between the outer skin and the core surface. Any air gap will result in reduced impact strength.

Preferably, the core is comprised of a syntactic foam according to the first aspect of the present invention. Syntactic foams have been used in aerospace applications for filling honeycomb cores and as filler material between skins of antenna radomes. These foams are based on balloon filled liquid or powder resins. The balloons range in size from microscopic size particles to BB or shot size material.

Syntactic foams differ from gas-blown foams in that syntactic foams contain balloons which are physical structures (e.g., glass, plastic or ceramic) which are gas filled, whereas gas-blown foams merely contain air bubbles. Since the balloon acts as a particle, foams made from these materials have extremely high strength, low weight and excellent temperature resistance. Syntactic foams do not change volume upon curing as do foam-in-place materials that are more common in commercial products. As such, these materials can be cast to the exact dimensions required for use as in a core for a golf club head.

Syntactic foam cores of the present invention contain resins dispersed into conventional fillers such as extenders (e.g., oil or wax), reinforcements, blowing agents, expanding microballoons (e.g., ceramic or plastic), cenospheres, glass microballoons, flakes (e.g., mica), acicular fibers, chopped fibers, solid spheres, powders or clays (e.g., silicates or alumina), thixotropic agents and reactive diluents. The fillers of the present invention can vary widely. But most preferably, balloons and other spherical particles are 1 micron to ⅛ inch, fibers (chopped or otherwise) vary in size from 10 microns to ¼ inch and flakes are 5 microns to ⅛ inch in size.

A wide range of conventional resins are usable in the present invention, which include polyamides, polyesters and graft copolymers. Epoxy resins are preferred. Epoxy resins can be obtained commercially, with a low molecular weight epoxy resin being most preferred, such as a diglycidyl ether of bisphenol-A (resin) cured with a propylene amine hardener. A particularly low molecular weight epoxy resin is chosen for its low viscosity (very fluid) which serves to enhance the ability for filler introduction.

The preferred syntactic foam core used in the present invention is fabricated from ceramic microspheres blended into an epoxy resin that is, preferably, chemically compatible with the resin used to construct the outer covering layer. The ceramic microspheres or microballoons are a byproduct of the coal burning electric generation process. This material, when washed and sized, contains an alumina-silica based microballoon with extremely high compression strength. These microballoons serve two purposes in the syntactic core: (1) they lower the density of the epoxy resin when mixed, and (2) increase the hardness of the cured epoxy resin mixture due to the high compression strength of the spheres.

Ceramic microspheres are obtained commercially already cleaned and sized (screened for a particular particle size range). Ceramic fillers (e.g., as microspheres or microballoons) can be employed in concentrations of up to about 35 parts by weight (PBW). However, filler concentrations of less than about 25 PBW is preferred, since larger filler microballoons can then be employed, which results in a reduction of specific gravity, with improved impact and crush strength in the resultant club head.

Spheres are chosen over fiber type reinforcements because the sphere represents the lowest surface area for a given volume. Introducing a high surface area filler into a resinous mixture by use of a fiber reinforcement, results in a severe increase in viscosity (reduction in fluidity) of the mixture, making processing into complex shapes more difficult. In contrast, the presently employed spherical shape disperses more evenly within the resin, resulting in more anisotropic mechanical properties than that obtainable by use of fiber reinforced materials. This anisotropy is tantamount to obtaining the uniform hardness and response of the driver hitting surface of the present invention.

Mixing fillers (e.g., ceramic microspheres or microballoons) into an epoxy resin with the desired properties is accomplished through the use of chemical additives called coupling agents. The present invention contemplates the use of conventional coupling agents such as wetting agents, surfactants, dispersants, defoamers and reactive agents. Specific organometallic coupling agents employing titanates, zirconates and silanes are preferred, with organometallic titanates being the most preferred. These coupling agents form a monomolecular layer of active chemical bonding sites on the surface of the filler, allowing the epoxy resin to readily envelope the entire surface of the sphere with a minimal quantity of resin. This results in the ability to use an increased amount of a filler in the resin before the viscosity (or consistency) is increased to a point that the mixture would be too thick to use. The increased balloon content of the resin yields a greater reduction in density than is possible without the use of coupling agents.

The amount of coupling agent is approximately 0.5–2.0% by weight based on the weight of the quantity of filler to be used. The amount of filler concentration, as a percent of total mixture by volume, ranges from approximately 5–55%. In a preferred embodiment, the admixed volume ratio of the filler to resin is preferably about 25–30%. For instance, an embodiment wherein the volume percent of the resin is 47.5%, the filler (e.g., cenospheres) is 30%, the hardener is 22% and the coupling agent is 0.5% is exemplary of the present invention.

In practice, a resin (e.g., epoxy) is first treated with 0.5–1.5% of coupling agent based on the weight of the quantity of filler used. Both the resin mixture and the hardener are then separately heated to 130°–150° F. to further reduce the viscosity of the resin mixture. The desired quantity of filler is divided equally and then introduced slowly to individual components of the epoxy resin and hardener. The mixture is agitated using an industrial paint mixer operating at low speed (100–200 RPM). Low speeds are essential so as not to break apart the microballoons present in the resin mixture. Even though these balloons have an extremely high compression strength, their size is such that the high speed impact of a mixer blade can result in extremely high impact forces which would break open the spheres and negate their density reduction capacity as well as reduce the strength of the cured mixture.

Portions of the now microballoon-filled resin and hardener are then weighed out in the proper ratio for the desired cure. The resin and hardener are then mixed together using a static mixer which also does not harm the microballoons, but allows for thorough mixing so that a proper curing chemical reaction can occur. The static mixer is a commercially available device that can be attached to a commercially available meter pump that regulates the ratio of resin and hardener material introduced into the mixer. This machine promotes material mixing with low shearing forces, insuring that the correct amount of hardener and resin are employed. The mixed material is injected into a matched tool mold and allowed to cure at 180°–200° F. for approximately 1 hour. After this period of time, the parts can be demolded and the mold then prepared for the next batch of material.

The combination of heating the resin and hardener, employing a coupling agent (e.g., titanates or zirconates), choosing an optimal filler (e.g., ceramic microsphere) for the syntactic foam, and employing a low pressure/shear mixing process, produce a core material with unique and desirable properties. Through variations in the volume percent of filler and judicious application of the coupling agent, a custom density and hardness can be obtained for various types of golf club head designs which include woods, irons, and putters.

Upon completing manufacture of the core, the core is wrapped under tension with a continuous fiber material. As methods for wrapping the core, the invention shall not be limited, so long as the core is tightly wrapped with a continuous fiber, and so long as the continuous fiber extends around at least the portion of the core which is closest to the club face of the golf club head which strikes the ball. Using such construction, the impact load generated when the golf club head face strikes the ball is transferred, after penetrating the resin shell of the golf club head face, to the continuous fiber positioned thereunder on the core. Then, the impact load is uniformly distributed over the continuous fiber.

As possible configurations which can be employed for preparing the core, the core may have one or more continuous fibers extending around the core from front to back so that at least the surface of the core which is closest and adjacent to the club face is covered with the continuous fiber. Preferably, one or more continuous fibers extend around the entire surface of the core. More preferably, the entire surface of the core is covered with a braided fiber construction.

Alternatively, the objects of the invention may be accomplished using a core comprised of two or more components. For example, a first core component may be wrapped or braided with the continuous fiber, while the second core component is unwrapped. In one such embodiment, it is contemplated that a fully braided first core component is inserted into a corresponding recess in a fully uncovered second core component to form a complete core having the desired shape and properties.

As the fiber material to be used in the invention, carbon (e.g., graphite), KEVLAR™, SPECTRA™, aramid, nylon, glass, metal or any other suitable fiber may be employed.

One or more layers (preferably 1–2 layers) of continuous fiber is preferably woven around the core. This is accomplished using, for example, a multiple spindle braiding machine such as a New England Butt Braider or equivalent. The fiber volume of the braid is approximately 35% to 65% parts per volume and the braid angle is approximately 30 to 60 degrees. The use of a mixture of fiber types with differences in braid angles is preferred which allows for significant tailoring of properties to achieve specific strengthening of the golf head in various selected directions.

Thus according to the invention, the use of a syntactic core for a driver head in conjunction with an outer braided layer or layers is most preferred, particularly a syntactic core manufactured from ceramic microspheres. Once the syntactic foam core is constructed, it is surrounded by a braided graphite composite fiber.

Figure 2:
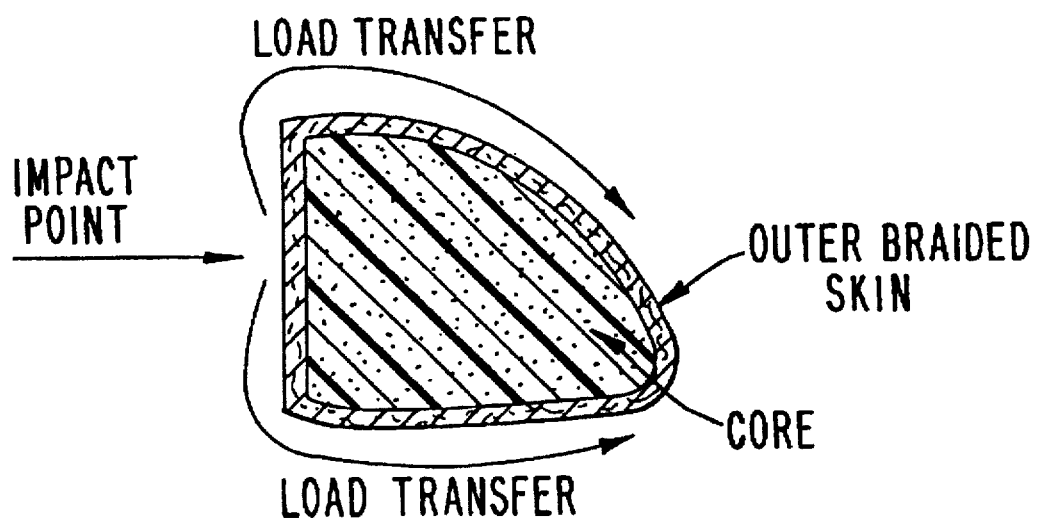
FIG. 2 is a cross-sectional side view of an embodiment of the present invention showing a golf club head with a core and a layer of braided fiber surrounding the core.
Figure 3A:
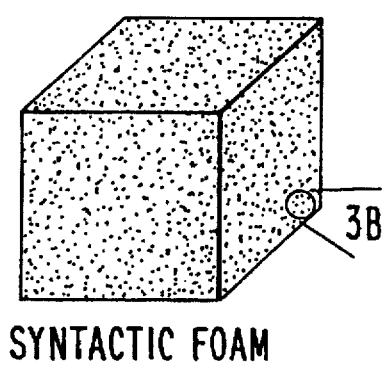
FIG. 3 is a front and side representation of a syntactic foam from which a horizontal microscopic section has been removed in order to show microballoons interspersed among the resin particles.
Figure 3B:
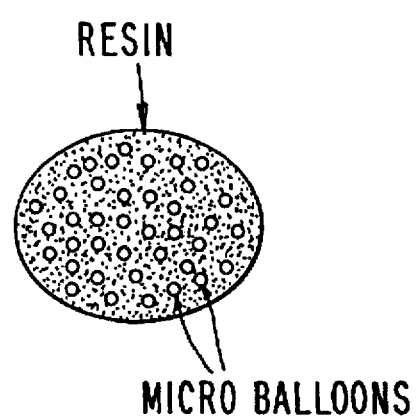

Although graphite composite is not new to golf clubs, the wrapped and braided construction used in the present invention is new. Braiding as used in its conventional applications is a form of weaving and involves the use of multiple strands that are intertwined to form the braid. Braiding in the instant new application involves weaving a plurality of continuous graphite fibers around a golf club head core of a predetermined shape (see FIG. 2).

The use of the term "continuous" in the context of the fiber means that the fiber is not dispersed in discrete chopped pieces (e.g. usually about ¼ or ⅛ inch in length) in the resin shell, but that the fiber extends around the entire circumference of the core, or a core component, at least a single time in any particular direction. Preferably, the continuous fiber encircles the core or core component a plurality of times. The braiding process provides a continuous fiber wrapping from the face of the club and around the back, and the resin provides a means for holding the fibers together by forming a hard surface. The braided construction helps evenly distribute the impact load throughout the head from any contact point on the surface. The braided feature permits even fiber tension throughout the club head and it is in tension applications that graphite rivals metals in strength, but at significantly lower weight.

Once braided, the core is then placed within a matched tooled mold that defines the final shape and dimension of the club head. This mold is fitted with sufficient entry and exit ports to allow for injection of the epoxy, urethane, or other suitable resin system. The mold is then placed entirely within a vacuum chamber and evacuated, preferably to 29 inches of mercury vacuum. This will prevent air entrapment and create a head that is free of air bubbles. The resin is heated, mixed and injected into the mold under pressure (30–100 psi). The resin permeates the braided fabric around the core and forms the outer surface of the club head. Once filled, the mold is removed from the vacuum chamber and placed in a preheated oven (150° F. to 350° F. depending on the resin system) for the appropriate final cure. After complete cure is achieved, the mold is opened, the head is removed and is ready for cosmetic dressing before assembly into a complete golf club. The final golf club is conventionally constructed by connecting the head to the golf club shaft by adhesively bonding the shaft within a hole bored or drilled into the club head.

While the invention has been described in detail and with reference to specific embodiments thereof, it will be apparent to one skilled in the art that various changes and modifications can be made therein without departing from the spirit and scope of the invention.

We claim:

1. A golf club head comprising a central core having an outer surface, a tensioned continuous fiber extending around said outer surface at least a single time, and an external resin layer which covers said central core and said continuous fiber.

2. The golf club head according to claim 1, wherein said continuous fiber extends around said outer surface of said central core a plurality of times.

3. The golf club head according to claim 1, wherein said continuous fiber extends around the entire outer surface of said central core.

4. The golf club head according to claim 1, wherein said continuous fiber is a plurality of continuous fibers.

5. The golf club head according to claim 4, wherein said plurality of continuous fibers are braided or woven.

6. A golf club head comprising a central core, said central core being comprised of first and second core components, said first core component having an outer surface and having a tensioned continuous fiber extending around said outer surface at least a single time, and an external resin layer which covers said central core and said continuous fiber.

7. The golf club head according to claim 6, wherein said continuous fiber extends around said outer surface of said first core component a plurality of times.

8. The golf club head according to claim 6, wherein said continuous fiber is a plurality of continuous fibers.

9. The golf club head according to claim 8, wherein said plurality of fibers are braided or woven.

10. The golf club head according to claim 1 or 6, wherein said resin is epoxy or urethane.

11. The golf club head according to claim 1 or 6, wherein said continuous fiber is comprised of graphite.

12. The golf club head according to claim 1 or 6, wherein said central core comprises a syntactic foam.

13. The golf club head according to claim 12, wherein said syntactic foam contains ceramic microspheres.

14. The golf club head according to claim 12, wherein said syntactic foam comprises an epoxy or urethane resin, a filler, a hardener and a coupling agent.

15. The golf club head according to claim 12, wherein said filler is selected from the group consisting of glass, plastic or ceramic microspheres.

16. The golf club head according to claim 12, wherein the coupling agent is an organometallic titanate.

17. A golf club comprising the golf club head of any one of claims 1–9.

18. A method for making a golf club head comprising the steps of:

forming a central core of the golf club head, wrapping under tension a continuous fiber around the central core at least a single time to obtain a fiber-wrapped central core, placing the fiber-wrapped central core in a mold, injecting resin around the fiber-wrapped central core, curing the resin to obtain the golf club head, and removing the golf club head from the mold.

19. The method of making a golf club head according to claim 18, wherein the fiber completely surrounds the central core.

20. A method for making a golf club head comprising the steps of:

forming first and second core components of a central core for a golf club head, wrapping under tension a continuous fiber around the first core component at least a single time to obtain a fiber-wrapped first core component, joining the first and second core components to obtain the central core, placing the central core in a mold, injecting resin around the central core, curing the resin to obtain the golf club head, and removing the golf club head from the mold.

21. The method of making a golf club head according to claim 20, wherein the fiber completely surrounds the central core.

* * * * *